(12) United States Patent
Zuro

(10) Patent No.: US 7,558,436 B2
(45) Date of Patent: Jul. 7, 2009

(54) IMAGE DYNAMIC RANGE CONTROL FOR VISUAL DISPLAY

(75) Inventor: Gregory Zuro, Portland, OR (US)

(73) Assignee: Max-Viz, Inc., Portland, OR (US)

( * ) Notice: Subject to any disclaimer, the term of this patent is extended or adjusted under 35 U.S.C. 154(b) by 165 days.

(21) Appl. No.: 11/491,449

(22) Filed: Jul. 20, 2006

(65) Prior Publication Data

US 2008/0019608 A1    Jan. 24, 2008

(51) Int. Cl.
G06K 9/40    (2006.01)
(52) U.S. Cl. .................... 382/274; 382/263; 382/264
(58) Field of Classification Search ......... 382/263–266, 382/274
See application file for complete search history.

(56) References Cited

U.S. PATENT DOCUMENTS

| | | | | |
|---|---|---|---|---|
| 5,799,111 | A * | 8/1998 | Guissin | 382/254 |
| 5,978,518 | A * | 11/1999 | Oliyide et al. | 382/260 |
| 6,850,642 | B1 * | 2/2005 | Wang | 382/169 |
| 7,340,162 | B2 * | 3/2008 | Terre et al. | 396/275 |
| 2004/0136605 | A1 * | 7/2004 | Seger et al. | 382/274 |
| 2004/0239798 | A1 * | 12/2004 | Nayar et al. | 348/362 |
| 2005/0104900 | A1 * | 5/2005 | Toyama et al. | 345/629 |
| 2006/0104508 | A1 * | 5/2006 | Daly et al. | 382/167 |
| 2006/0104533 | A1 * | 5/2006 | Daly et al. | 382/254 |
| 2006/0239582 | A1 * | 10/2006 | Hyoudou | 382/274 |

OTHER PUBLICATIONS

Adaptive dynamic range compression, Guissin, SPIE, 000353551620070101, Abstract.*
Nonlinear dynamic range transformation, Alter-Gartenberg, IEEE, 000525314520070101, Abstract.*
Pizer et al., "Adaptive Histogram Equalization and Its Variations," *Computer Vision, Graphics, and Image Processing*, vol. 39, pp. 355-368 (Sep. 1987).
Fattal et al., "Gradient Domain High Dynamic Range Compression," *ACM Transactions on Graphics (TOG)*, vol. 21, No. 3 (Jul. 2002).
Reza et al., "Realization of the Contrast Limited Adaptive Histogram Equalization (CLAHE) for Real-Time Image Enhancement," *Journal of VLSI Signal Processing Systems*, vol. 38, No. 1, pp. 35-44 (Aug. 2004).

* cited by examiner

*Primary Examiner*—Jingge Wu
*Assistant Examiner*—Jayesh A Patel
(74) *Attorney, Agent, or Firm*—Stoel Rives LLP

(57) ABSTRACT

Preferred embodiments of an image display system achieve mapping of high dynamic range image data to render on a lower dynamic range display device a corresponding image characterized by stable global intensity levels and visually perceptible local area detail. The high dynamic range image data include representations of relatively low intensity contrast, high spatial frequency details and relatively low spatial frequency intensities. Data derived from the high dynamic range image data are applied to a nonlinear intensity transform. The nonlinear intensity transform preserves or enhances the low intensity contrast, high spatial frequency details and maintains a visually perceptible representation of the relatively low spatial frequency intensities to thereby provide visually perceptible local area detail. An exemplary embodiment derives high dynamic range image data from a thermal infrared camera for use with aircraft.

18 Claims, 6 Drawing Sheets

— High dynamic range data
— — Low dynamic range data
------ Control Signals

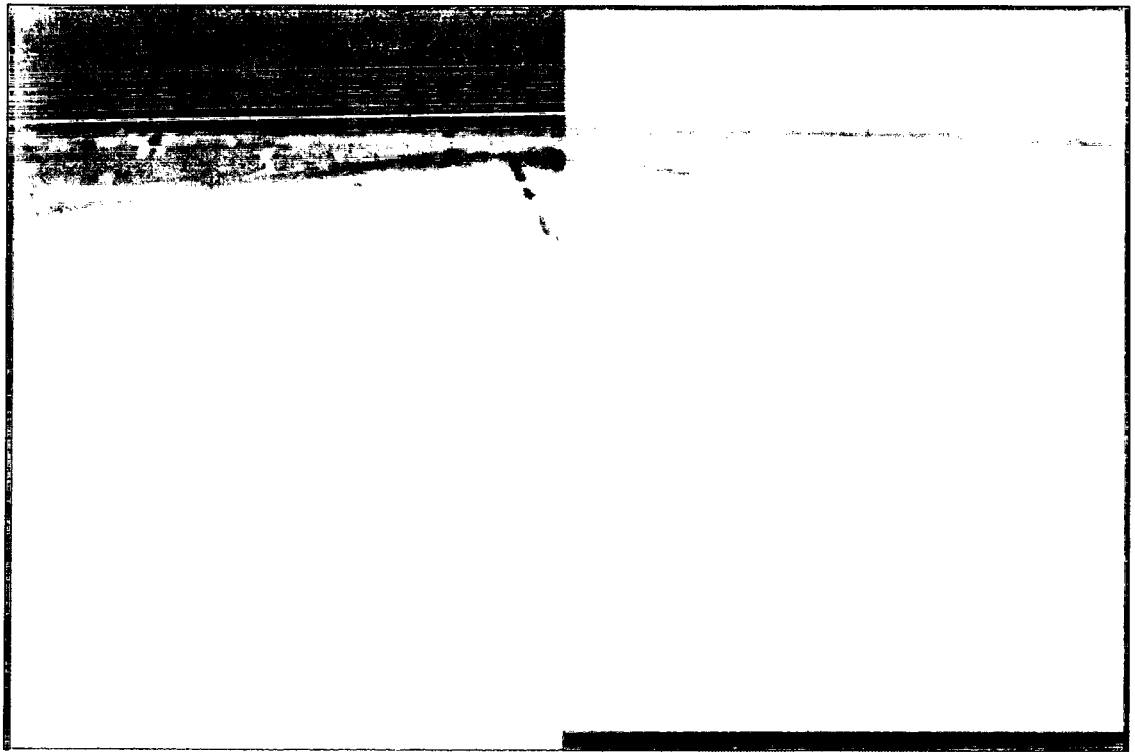
FIG. 11 – Unprocessed and processed example image
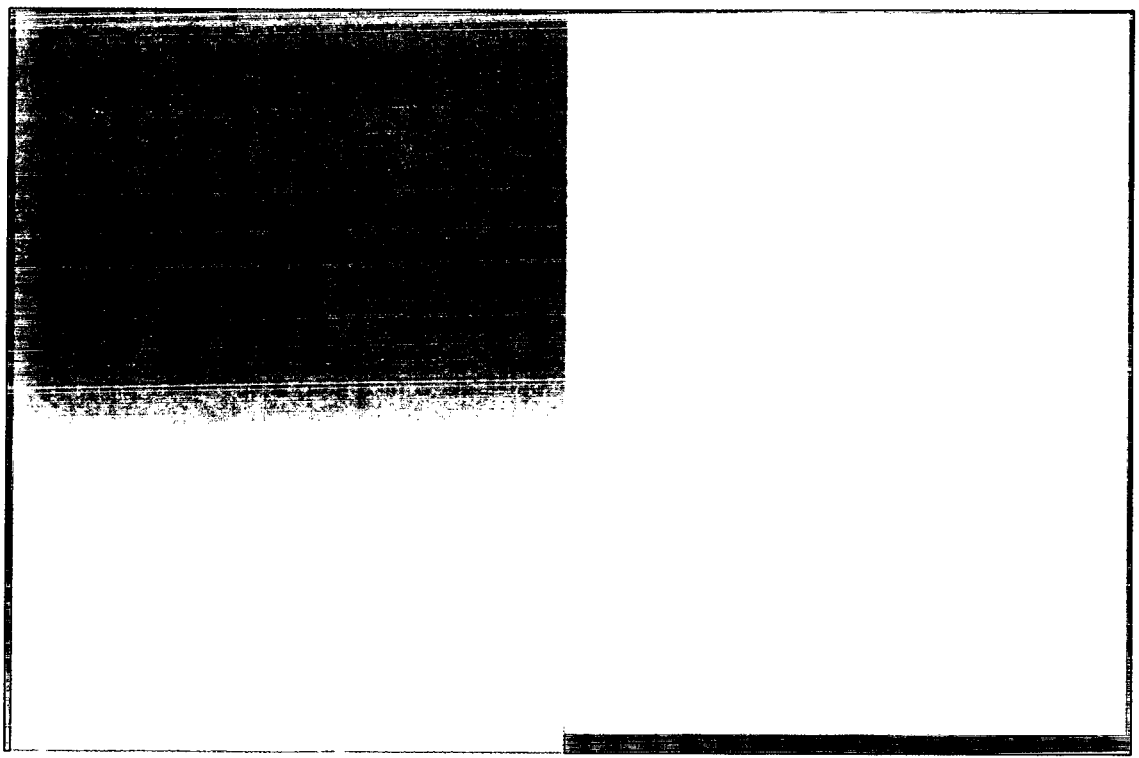
FIG. 12 – Unprocessed and processed example image

US 7,558,436 B2

IMAGE DYNAMIC RANGE CONTROL FOR VISUAL DISPLAY

TECHNICAL FIELD

This disclosure describes a system and method by which arbitrary images produced by a high dynamic range camera are displayed on a dynamic range-limited display device. The system and method process image data in such a way as to maintain or enhance local contrast while limiting overall image dynamic range.

BACKGROUND INFORMATION

The output of sensors with a high dynamic range can be difficult to render on typical imaging displays. The need to render large differences in intensity and the need to achieve sufficient contrast in areas of relatively uniform intensity compete with each other, given the limited dynamic range of available display devices. An example is a thermal infrared image of a warm airport runway that includes areas of clear sky. The runway will be hot relative to non-runway ground areas, and very hot relative to the sky areas. In this case, reliably representing the relative thermal differences among these three areas along with minute thermal differences within each of these areas would be impossible without use of some sort of non-linear, spatially sensitive intensity transform.

In addition to dynamic range limitations, typical display devices have characteristic intensity curves that result in differences in perceived intensity with varying input intensity. A particular intensity difference may, for example, be more perceptible if the average intensity is in the middle, as opposed to the extreme low end or high end, of the output range of the display.

The problem to be solved is the stabilizing of global intensity levels of the displayed image while optimizing local area detail. There exist a number of approaches to solving the problem, many of them under the category of histogram equalization (HE) (or "histogram stretching") reviewed in Pier, Stephen M.; Amburn, E. Philip; Cromartie, Robert; et al., Adaptive histogram equalization and its variations, *Computer Vision, Graphics, and Image Processing*, vol. 39, issue 3, pp. 355-68, September 1987, and in Reza, Ali M., Realization of the Contrast Limited Adaptive Histogram Equalization (CLAHE) for Real-Time Image Enhancement, *Journal of VLSI Signal Processing Systems*, vol. 38, no. 1, pp. 35-44, August 2004. In this technique, the brightness values of image pixels are reassigned based on a histogram of their input intensities. In the simplest "flattening" approach, the broad goal is to assign an equal number of pixels to each possible brightness level. In more sophisticated processors, the process is "adaptive" in that the nonlinear transformations are applied on a local area or multi-scale basis. Other operations such as minimum, maximum, and median filters, as well as clipping, may be applied.

Another approach is gradient domain dynamic range compression (GDDRC), which is described in Fattal, Raanan; Lischinski, Dani; Werman, Michael, Gradient domain high dynamic range compression, *ACM Transactions on Graphics (TOG)*, vol. 21 no. 3, July 2002. The GDDRC technique works in the logarithmic domain to shrink large intensity gradients more aggressively than small gradients. This serves to reduce the global contrast ratio, while preserving local detail.

Histogram manipulations are effective for the particular problem of fine details in dark image regions. However, good quality image details can actually be degraded by naïve implementation of these algorithms. Neither HE nor GDDRC constitutes a seamless, esthetically pleasing and information-preserving solution to widely varying levels and contrasts over arbitrary image scenes.

SUMMARY OF THE DISCLOSURE

The preferred embodiments disclosed achieve mapping of high dynamic range image data to render on a lower dynamic range display device a corresponding image characterized by stable global intensity levels and visually perceptible local area detail. The high dynamic range image data include representations of relatively low intensity contrast, high spatial frequency details and relatively low spatial frequency intensities. Data derived from the high dynamic range image data are applied to a nonlinear intensity transform. The nonlinear intensity transform preserves or enhances the low intensity contrast, high spatial frequency details and maintains a visually perceptible representation of the relatively low spatial frequency intensities to thereby provide visually perceptible local area detail. Saturation of image detail is avoided, as is the formation of artifacts such as "halos" around high spatial frequency image features. The computations are relatively simple and hence may be implemented on an economical processing platform. While the airborne application described above is of interest, the approach is appropriate across a wide range of thermal imaging systems in which mapping from a high dynamic range camera to a much lower dynamic range display is a challenge. The preferred embodiments implement an elegant and practical solution to the global/local dynamic range compression problem, while correcting for artifacts arising from spatial frequency manipulations.

Additional aspects and advantages will be apparent from the following detailed description of preferred embodiments, which proceeds with reference to the accompanying drawings.

BRIEF DESCRIPTION OF THE DRAWINGS

FIGS. 11 and 12 show for two different airport runway scenes comparative relationships of images reduced in dynamic range by least significant bits truncation (left side images) and by nonlinear intensity transform processing in accordance with the disclosure (right side images).

DETAILED DESCRIPTION OF PREFERRED EMBODIMENTS

Figure 1:
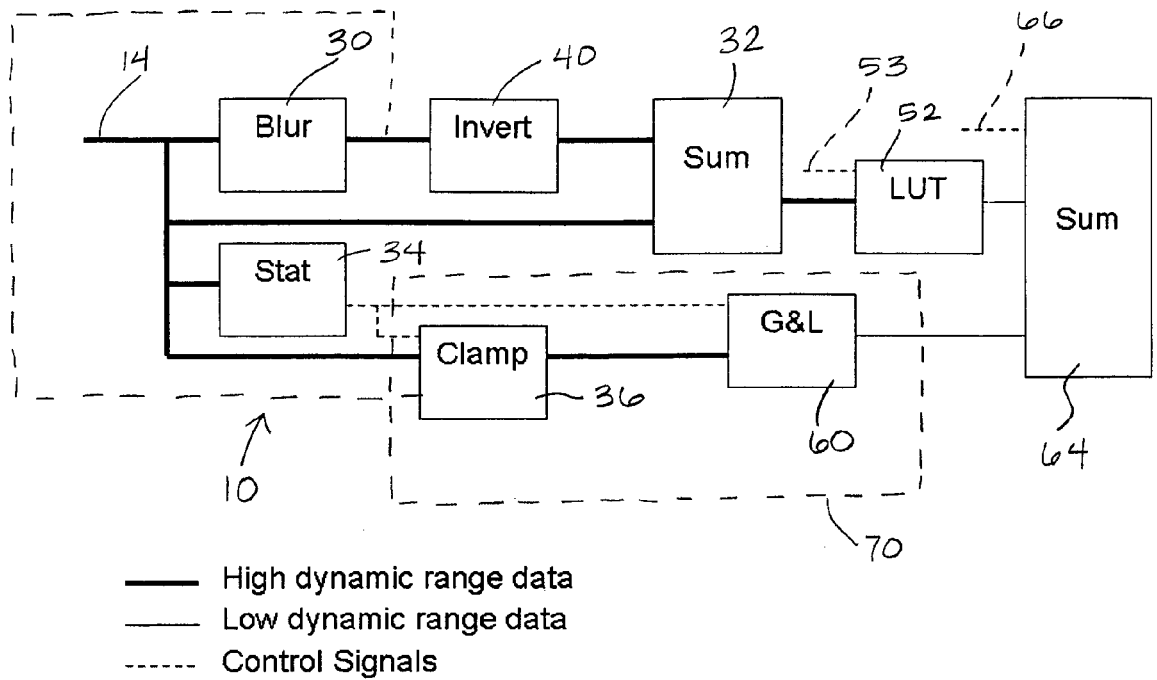
FIG. 1 is a block diagram of an embodiment of a system that implements a nonlinear intensity transform to enable display of high dynamic range images on a dynamic range-limited display device.
Figure 2:
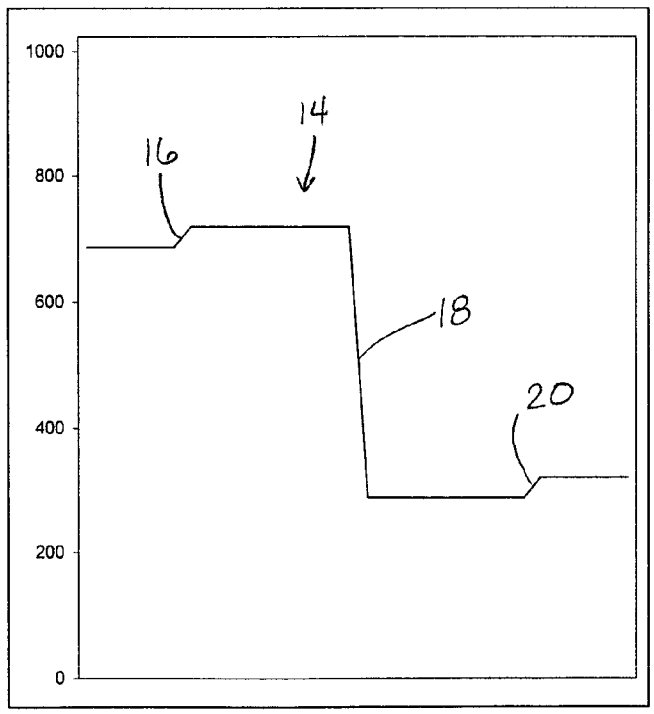
FIG. 2 is an arbitrary example of a high dynamic range (HDR) image data waveform applied to the system of FIG. 1.

The preferred embodiments include a number of modular processing units existing as computer algorithms implemented in a general processing unit or as hardware constructs in, for instance, a field programmable gate array (FPGA), as arranged in a system 10 shown in FIG. 1. System 10 receives a high dynamic range image data waveform produced by a high dynamic range imaging device, such as a thermal infrared camera (not shown). FIG. 2 shows an arbitrary high dynamic range (HDR) image data waveform 14 representing, for example, a 10-bit input signal. HDR waveform 14 has three discontinuities 16, 18, and 20. FIGS. 3, 4, 5, 6, 7, 8, and 9 show the waveforms produced at the outputs of their associated processing units of system 10 in response to application of HDR waveform 14. Each of these drawing figures depicts along the Y-axis the full extent of the dynamic range of intensity and represents along the X-axis a series of hypothetical pixels along a single line of the image data represented by HDR waveform 14. Each of three discontinuities 16, 18, and 20 in intensity of HDR waveform 14 in FIG. 2 is considered to be of high frequency for purposes of this example.

Figure 3:
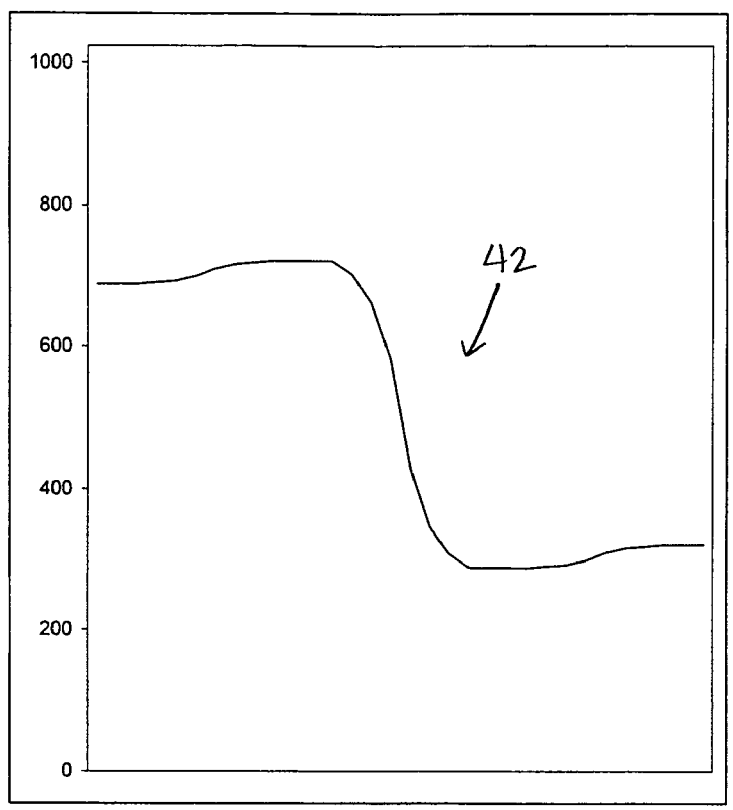
FIGS. 3, 4, 5, 6, 7, 8, and 9 are waveforms produced at the outputs of their associated processing unit modules of the system of FIG. 1 in response to application of the HDR waveform of FIG. 2.
Figure 4:
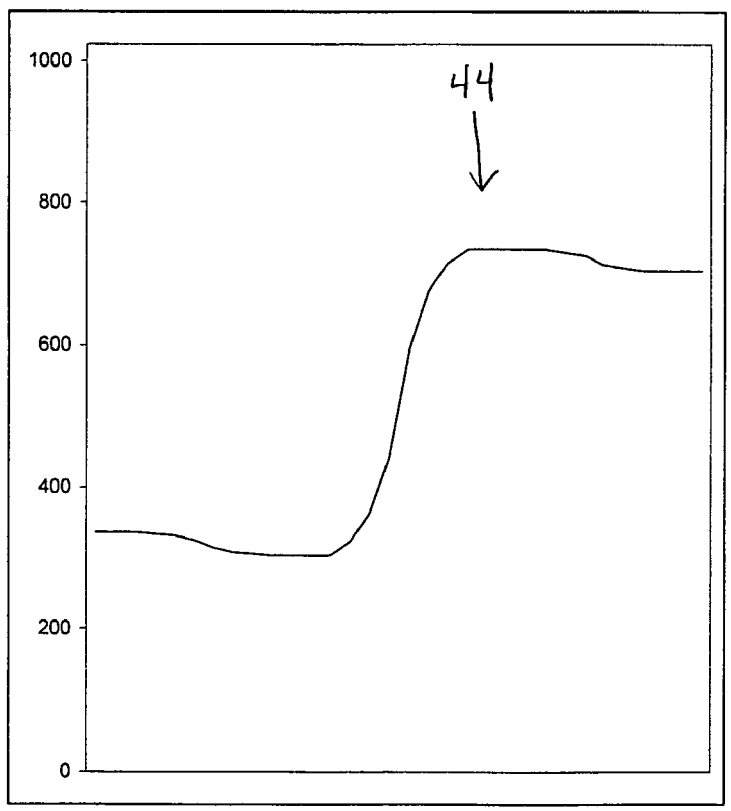

In a first embodiment, HDR waveform 14 is applied to the inputs of a blurring spatial filter 30, a summing unit 32, a statistics unit 34, and a clamping unit 36. In an alternative, second embodiment HDR waveform 14 is applied to the inputs of blurring spatial filter 30, summing unit 32, and statistics unit 34; and the output of blurring spatial filter 30 is applied to the input of clamping unit 36 (as shown in dashed lines in FIG. 1). The following description is directed to the first embodiment. A signal inverting unit 40 receives from spatial filter 30 an output signal and delivers an inverted version of it to a second input of summing unit 32. FIG. 3 shows that blurring spatial filter 30 provides a waveform 42 representing a blurred version of HDR waveform 14, and FIG. 4 shows that inverting unit 40 provides a waveform 44 representing an inverted version of waveform 42.

Figure 5:
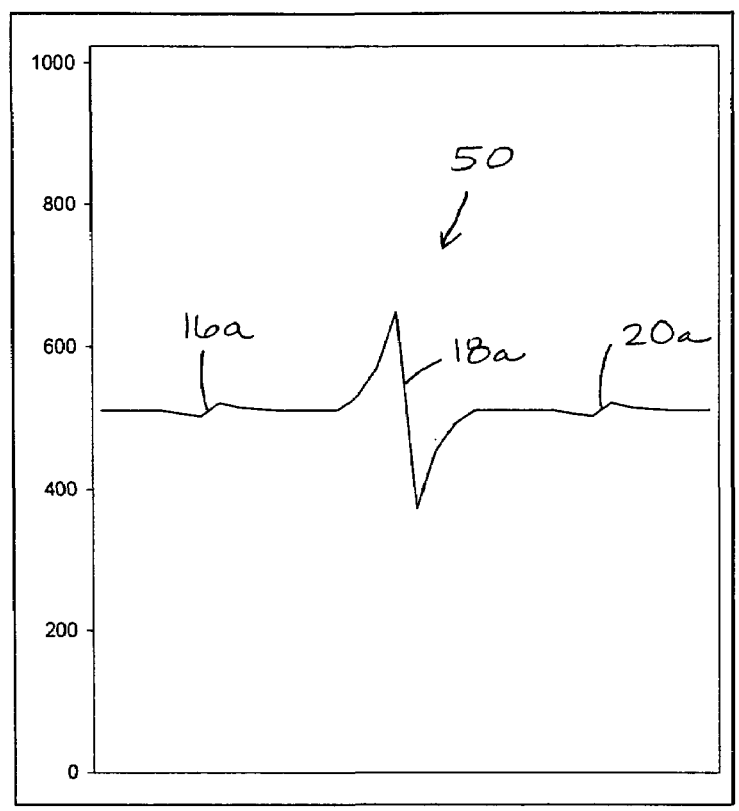

Blurring spatial filter 30, signal inverting unit 40, and summing unit 32 combine to form a high pass filter to process the incoming high bandwidth data represented by HDR waveform 14. Summing unit 32 adds the raw image data of HDR waveform 14 and the blurred and inverted image data of waveforms 42 and 44 and divides the result by two to maintain the same dynamic range as that of the raw image data. The desired effective kernel size of the high pass filter is fixed and is dependent upon the high dynamic range imaging device. FIG. 5 shows a waveform 50 that is developed at the output of summing unit 32. Waveform 50 represents a generally flat line signal trace, except for intensity spikes 16a, 18a, and 20a corresponding to, respectively, discontinuities 16, 18, and 20 of HDR waveform 14. Intensity spikes 16a, 18a, and 20a each have rising and falling edges and are positioned generally in the middle of the dynamic range of intensity.

Figure 10:
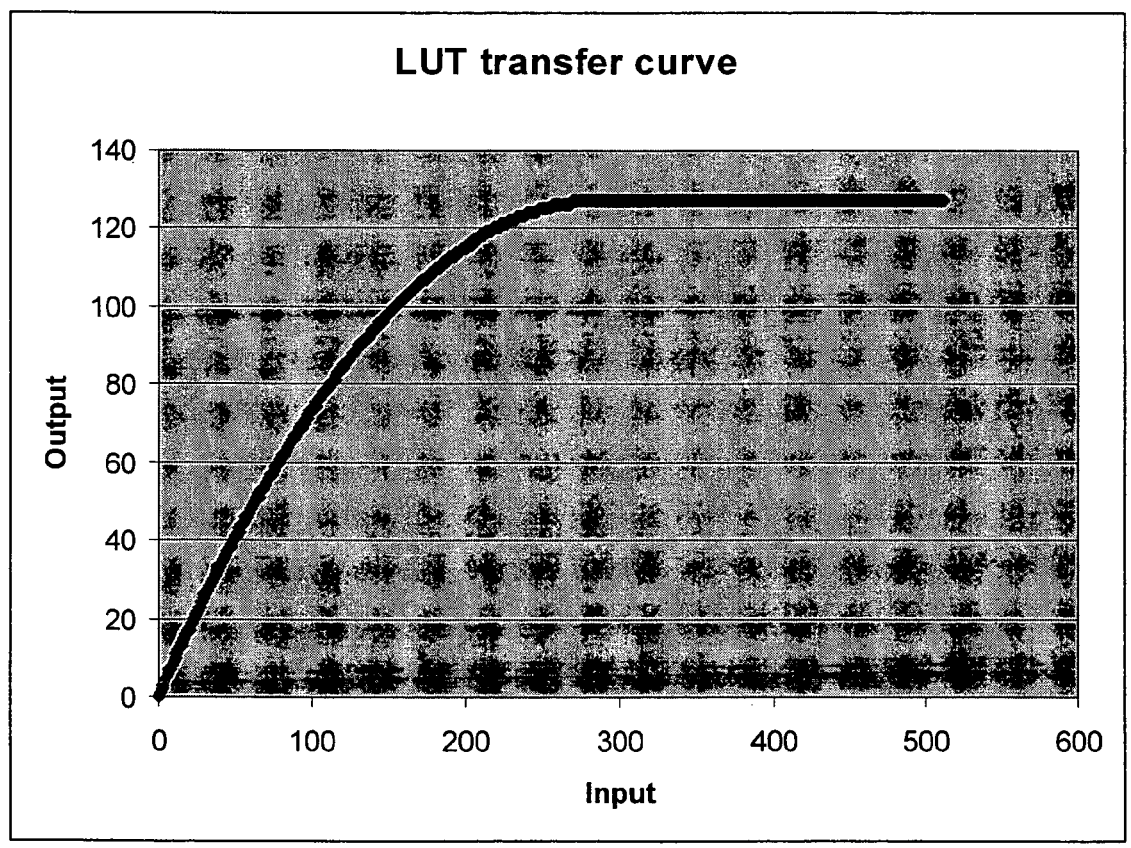
FIG. 10 is an example of a transfer curve stored in a look-up table (LUT) processing unit module of the system of FIG. 1.

The output of summing unit 32 is delivered to a dynamic look-up table (LUT) 52, which applies an intensity transform to the high-pass filtered image data produced by summing unit 32. This transform is designed to minimize visible artifacts of the high pass filter, most specifically spatial halos around imaged objects of very high or low intensity relative to their surroundings. A typical transform curve is shown in FIG. 10. The X-axis represents the absolute difference between the high pass image input to LUT 52 and the implicit average value of those data that will always be one-half of the dynamic range.

Figure 6:
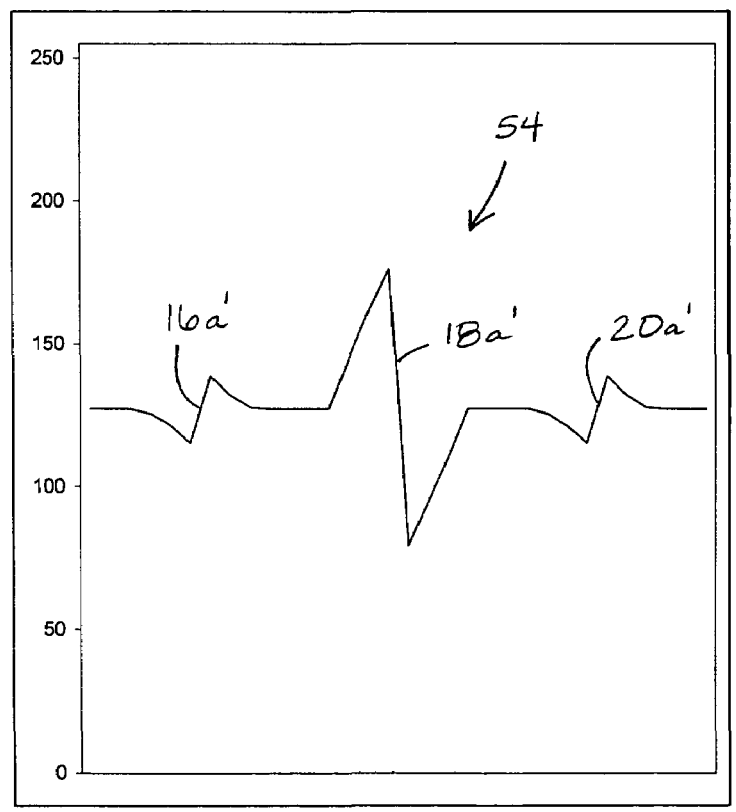

The actual values of this transform depend upon the input image data of HDR waveform 14 characteristics. LUT 52 has a control signal input 53 that determines, from a library, which transform curve to apply. This curve is chosen based on the dynamic range of the raw image input data of HDR 14. If that dynamic range is low, then a curve or look-up table with a higher output to input ratio (gain) may be selected. The subjective goal is to produce an output image, the dynamic range of which covers at least one-fourth of the dynamic range of an output display device. The maximum output value of LUT 52 is preferably no more than one-half of the dynamic range of the output display device. The gain implicit in LUT 52 is partly determined by the characteristic response of the high dynamic range imaging device and is, therefore, determined experimentally. The transform curve selected from LUT 52 may be changed between successive images. Generally, the most common stimuli are represented by input values that fall below the asymptotic limit, which is approximately 255 for the example of LUT 52, shown in FIG. 10. FIG. 6 shows a waveform 54 produced at the output of LUT 52, which is programmed to transform its input waveform 50 as described above. Intensity spikes 16a', 18a', and 20a' of waveform 52 corresponding to the respective intensity spikes 16a, 18a, and 20a of waveform 50 cover a larger portion of the dynamic range than that covered by waveform 50 in FIG. 5. In this example, the maximum intensity of waveform 52 is no greater than one-fifth of the dynamic range.

Figure 7:
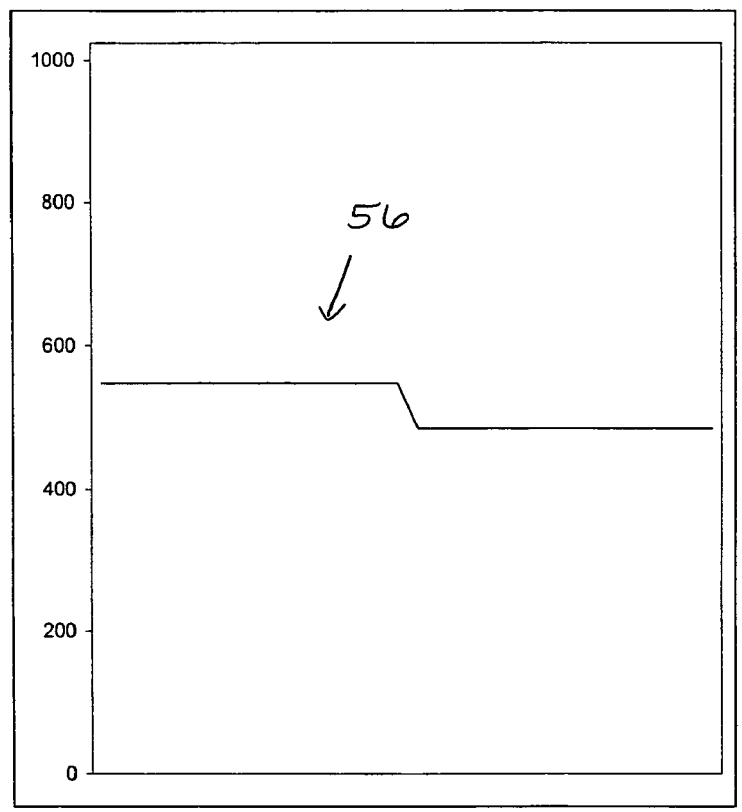

Statistics unit 34 calculates the mean of the high-dynamic range input image data and transmits that mean value to clamping unit 36. Clamping unit 36 limits the intensity extent of the high-dynamic range image data to a certain amount around the mean value calculated by statistics unit 34. FIG. 7 shows a waveform 56 produced at the output of clamping unit 36. In the second alternative embodiment clamping unit 36 limits the intensity extent of the blurred image data produced by blurring spatial filter 30.

Figure 8:
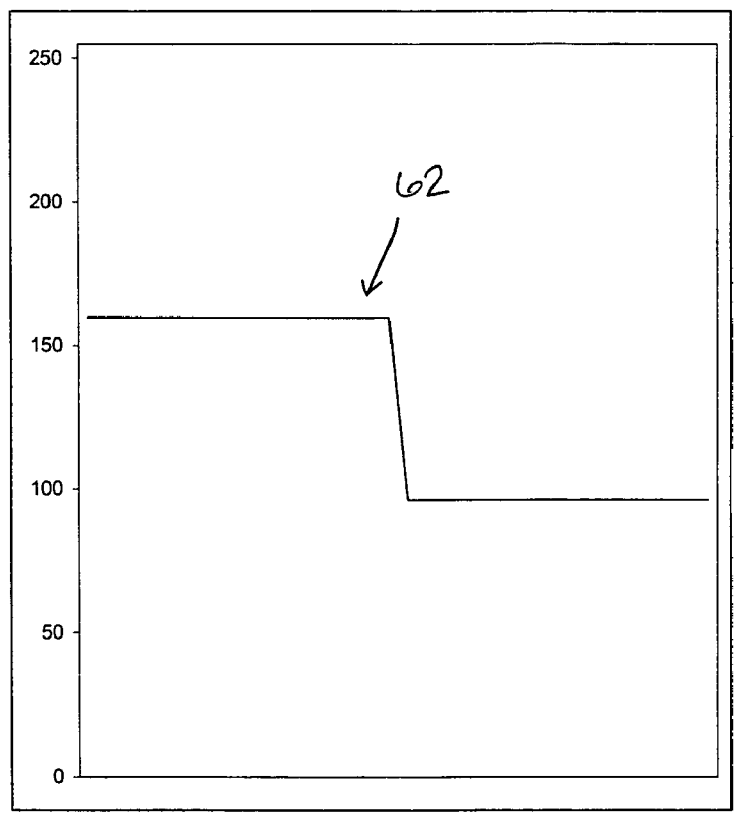

A dynamic gain and level unit 60 determines and applies a gain and level intensity transform to the clamped image data produced by clamping unit 36. This transform determines the minimum and maximum intensity extent of the incoming image data. These limits, along with the mean calculated by statistics unit 34, are used to calculate a gain that is then applied to the incoming image data. The gain is preferably determined as follows:

```
If (mean−min) < (max−mean), then
    Gain = low−range / [(mean−min)*2]
Else
    Gain = low−range / [(max−mean)*2]
End,
``` where 'Gain' is the gain applied to the incoming image data intensity values, 'low-range' is the number of possible low-dynamic range output intensities, 'mean' is the mean input intensity value calculated by statistics unit 34, 'min' is the minimum input intensity observed by dynamic gain and level unit 60, and 'max' is the maximum input intensity observed by dynamic gain and level unit 60. FIG. 8 shows a waveform 62 produced at the output of dynamic gain and level unit 60. Waveform 62 exhibits coverage of a wider portion but at a lower level of the dynamic range than that of waveform 56 of FIG. 7. Clamping unit 36 and dynamic gain and level unit 60 together function as a reference image unit 70.

Figure 9:
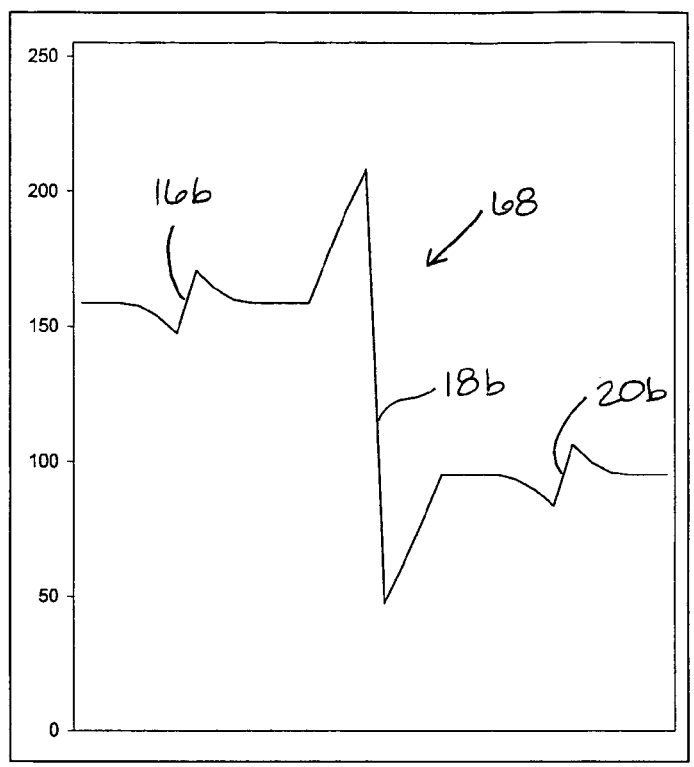

A variable summing unit 64 combines the high frequency data from LUT 52 with the low frequency data from gain and level unit 60. Variable summing unit 64 has a control signal input 66 that determines the ratio of high-frequency to low-frequency data. This is a subjective measure that may be determined by an observer. The outputs of LUT 52, dynamic gain and level unit 60, and variable summing unit 64 produce waveforms representing low dynamic range (LDR) image data. FIG. 9 shows a waveform 68 produced at the output of variable summing unit 64. Intensity spikes 16b, 18b, and 20b of waveform 68 correspond to the respective discontinuities 16, 18, and 20 of HDR waveform 14. Waveform 68 demonstrates that this approach ensures that the mean value of the high-dynamic range image is always represented in the low-dynamic range scene as the mid-range intensity of that low range.

An alternative determination of the gain is as follows:

Gain=low-range/(max−min).

The difference between the alternative method and the preferred method is that the former does not perform the "centering" of the output image intensity.

FIGS. 11 and 12 show practical examples of an image before and after being processed using the present invention. The left side of each image has been reduced in dynamic range by simply dropping the least significant bits, while the right side has been processed using the method described herein.

It will be obvious to those having skill in the art that many changes may be made to the details of the above-described embodiments without departing from the underlying principles of the invention. The scope of the present invention should, therefore, be determined only by the following claims.

The invention claimed is:

1. A system for mapping high dynamic range image data derived from a high dynamic range imaging device to render a corresponding image on a lower dynamic range display device, the high dynamic range image data including representations of relatively low intensity contrast, high spatial frequency detail and relatively low spatial frequency intensities, comprising:
    a filtering unit receiving the high dynamic range image data and producing high-pass filtered image data that include representations of high spatial frequency data of the high dynamic range image data, the filtering unit including:
        a blurring unit receiving as an input the high dynamic range image data and producing an output representing a blurred version of the high dynamic range image data;
        an inversion unit receiving the output from the blurring unit and producing an output representing an inverted version of the blurred high dynamic range image data; and
        a summing unit combining the high dynamic range image data with the output of the inversion unit while maintaining the same dynamic range as that of the high dynamic range image data to thereby produce the high-pass filtered image data;
    a conversion unit implemented with an intensity transform for converting the high-pass filtered image data to produce an output signal characterized by a dynamic range that is compatible with the lower dynamic range of the display device and the low intensity contrast, high spatial frequency detail of the high dynamic range image data;
    a reference image unit producing an output signal representing a gain and level adjustment of the high dynamic range image data; and
    a combining unit for combining the output signals of the conversion and the reference image units to produce a low dynamic range image with visually perceptible local area detail for display on the display device.

2. The system of claim 1, further comprising a statistics unit for determining a global mean intensity level of the high dynamic range image data.

3. The system of claim 2, wherein: the gain adjustment is determined by a minimum intensity extent, a maximum intensity extent, and the global mean intensity level of the high dynamic range image data; and the reference image unit sets the global mean intensity level of the high dynamic range image data in the lower dynamic range as approximately a mid-range intensity level of the lower dynamic range.

4. The system of claim 1, wherein the intensity transform is a non-linear intensity transform and minimizes visible artifacts generated by the filtering unit.

5. The system of claim 1, wherein the intensity transform is selected from a plurality of transform curves, the selection dictated by the dynamic range of the high dynamic range image data.

6. The system of claim 1, wherein the conversion unit optimizes the gain for converting the high-pass filtered image data to the lower dynamic range.

7. The system of claim 1, wherein the output signal of the reference image unit represents a clamped version of the high dynamic range image data.

8. The system of claim 7, in which the output of the blurring unit is applied to the reference image unit.

9. The system of claim 7, further comprising a statistics unit for determining a global mean intensity level of the high dynamic range image data, wherein the clamped version of the high dynamic range image data is limited by the global mean intensity level calculated by the statistics unit.

10. The system of claim 1, wherein the combining unit is controllable to selectively adjust a ratio of the output signals of the conversion and reference image units.

11. The system of claim 1, wherein the high dynamic range imaging device comprises a thermal infrared camera.

12. The system of claim 1, wherein the system is used in conjunction with aircraft.

13. A method of mapping high dynamic range image data to render on a lower dynamic range display device a corresponding image characterized by stable global intensity levels and visually perceptible local area detail, comprising:
    providing from a high dynamic range imaging device high dynamic range image data including representations of relatively low intensity contrast, high spatial frequency detail and relatively low spatial frequency intensities;
    deriving in a filtering unit high-pass filtered image data from the high dynamic range image data by:
        blurring the high dynamic range image data;
        inverting the blurred high dynamic range image data; and
        combining the high dynamic range image data with the inverted blurred high dynamic range image data; and
    performing in a processing unit the steps of:
        applying to the high-pass filtered image data a nonlinear intensity transform to produce a first set of low dynamic range image data, the nonlinear intensity transform substantially preserving or enhancing the low intensity contrast, high spatial frequency detail and maintaining a visually perceptible representation of the relatively low spatial frequency intensities represented in the high dynamic range image data;
        applying to data derived from the high dynamic range image data a gain and level adjustment to produce a second set of low dynamic range image data; and
        combining the first and second sets of low dynamic range image data to produce a low dynamic range image, the first set of low dynamic range image data providing visually perceptible local area detail within the low dynamic range image.

14. The method of claim 13, in which the high-pass filtered image data include representations of visible artifacts, and the nonlinear intensity transform is applied to the high-pass filtered image data to reduce perception of the visible artifacts.

15. The method of claim 13, further comprising: calculating a mean value of the high dynamic range image data; and presenting the mean value of the high dynamic range image data as a mid-range intensity of the low dynamic range image.

16. The method of claim 13, further comprising: selecting the nonlinear intensity transform from a plurality of transform curves, the selection dictated by the dynamic range of the high dynamic range image data.

17. The method of claim 13, wherein the high dynamic range image data are provided by a thermal infrared camera.

18. The method of claim 13, wherein the method is used in conjunction with aircraft.

* * * * *